Jan. 17, 1967 D. KOEHLER 3,299,294

HIGH-SPEED PULSE GENERATOR USING CHARGE-STORAGE STEP-RECOVERY DIODE

Filed April 28, 1964 2 Sheets-Sheet 1

INVENTOR
D. KOEHLER
BY R. B. Ardis
ATTORNEY

United States Patent Office 3,299,294

Patented Jan. 17, 1967

3,299,294

HIGH-SPEED PULSE GENERATOR USING CHARGE-STORAGE STEP-RECOVERY DIODE

Dankwart Koehler, New Providence, N.J., assignor to Bell Telephone Laboratories, Incorporated, New York, N.Y., a corporation of New York Filed Apr. 28, 1964, Ser. No. 363,124
5 Claims. (Cl. 307—88.5)

This invention relates generally to the production of extremely short electrical pulses at high repetition rates and, more particularly, to the production of such pulses under the control of a wave of alternating voltage.

In the past, the generation of short electrical pulses with abrupt leading and trailing edges has tended to be incompatible with the generation of pulses at high repetition rates. When these characteristics were combined, the generating circuits were complex, were operative over only restricted frequency ranges because of the presence of tuned circuits, required A.-C. control waves of relatively large amplitude, or placed comparatively severe restrictions upon the operating parameters of at least some of the circuit elements employed.

One object of the present invention is to generate short electrical pulses at high repetition rates in as simple a manner as possible.

Another object is to avoid narrow limits of available repetition rates in the generation of short pulses with abrupt leading and trailing edges.

Still another object is to permit A.-C. control waves of relatively small amplitude to be employed in the generation of short pulses at high repetition rates.

A further object is to eliminate any need for circuit elements with particularly close operating parameter tolerances in the generation of such pulses.

The invention makes use of the particular type of semiconductor charge-storage diode known as the step-recovery diode. This device is described, for example, in the paper "Harmonic Generation, Rectification, and Lifetime Evaluation with the Step Recovery Diode" by S. M. Krakauer, which appeared at pages 1665 through 1676 of the July 1962, issue of the Proceedings of the IRE. During the initial phase of reverse recovery in such a charge-storage diode, the conductivity remains substantially at its forward conduction value until the stored minority carries resulting from forward conduction have been depleted by the flow of reverse current and by minority carrier recombination. Reverse storage conduction then terminates abruptly and the diode conductivity drops to the low value usually associated with reverse saturation. The diode conductivity variation during reverse recovery thus approximates a step function.

In accordance with the invention, a charge-storage step-recovery diode having a recombination time which is large in comparison with the period of the alternating current is charged from an A.-C. source, during excursions of one polarity, through a series path which includes a switching diode poled in the same direction as the step-recovery diode and discharged, during excursions of the other polarity, though a different series path which includes the emitter-base junction of a transistor poled in the opposite direction from the step-recovery diode. The large recombination time of the charge-storage step-recovery diode permits a large charge to be stored while it is conducting in the forward direction even though the amplitude of the A.-C. wave is relatively small. The charge is then dissipated through the emitter-base junction of the transistor in the forward direction to initiate a pulse of current through the transistor emitter-collector path. That pulse is terminated abruptly as soon as the conductivity of the charge-storage step-recovery diode drops to its normal reverse saturation value. A sharp pulse is generated in this manner once during each cycle of the alternating control current and, because there is no long recovery time between pulses, extremely high repetition rates can be achieved. A minimum of components is required and, since no tuned circuits are employed, the frquency of the alternating control current, and hence the pulse repetition rate, can be varied over a wide range.

In several embodiments of the invention, provision is made for realizing additional measures of control over the duration of the generated pulses. In one, the energy stored in the charge-storage step-recovery diode while that diode is conducting in the forward direction is increased by biasing the charge-storage step-recovery diode and the switching diode in the forward direction by a voltage slightly less than their combined forward thresholds. The time interval the charge-storage step-recovery diode conducts in the forward direction during each cycle of the alternating control current is thereby lengthened, permitting a greater amount of energy to be stored and increasing the amplitude of the output pulse by the corresponding amount. In another embodiment, a pair of similar but complementary charge-storage step-recovery diode pulse generating circuits are used to switch a high-speed bistable circuit between its two respective stable states of equilibrium. The time difference between the two switching pulses, and hence the length of the ultimate output pulse of the system is determined by a difference in phase of the A.-C. control waves.

A more thorough understanding of the invention and its features may be obtained from a study of the following detailed description of several specific embodiments. In the drawings.

Figure 4:
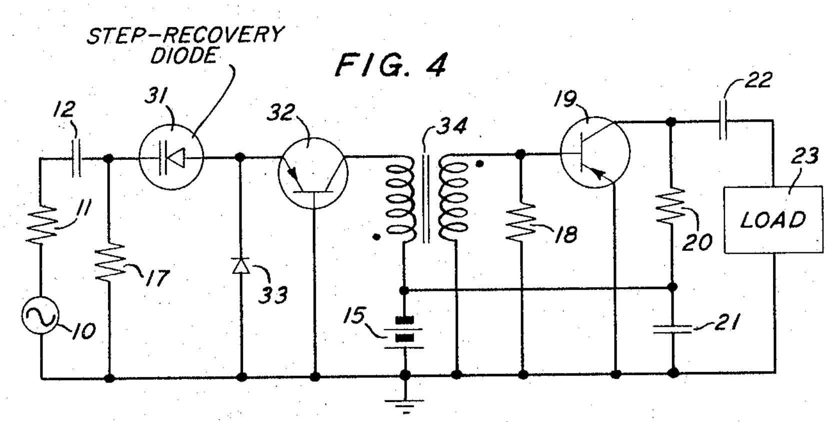
Figure 5:
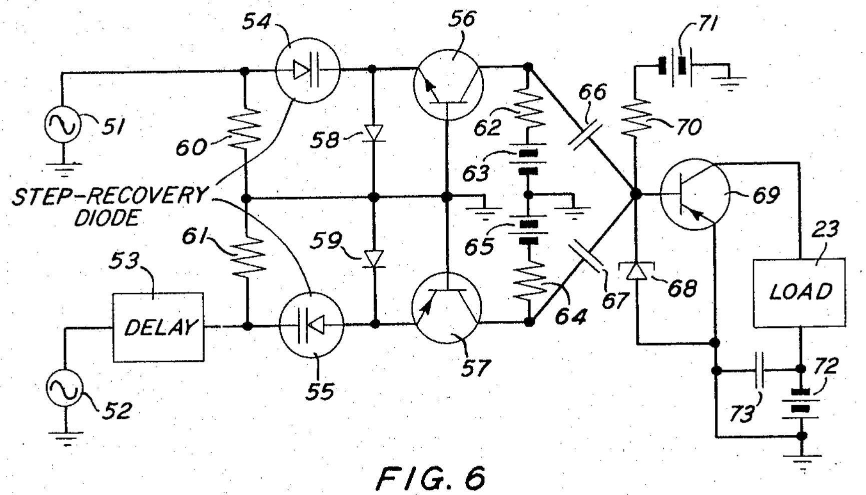
Figure 6:
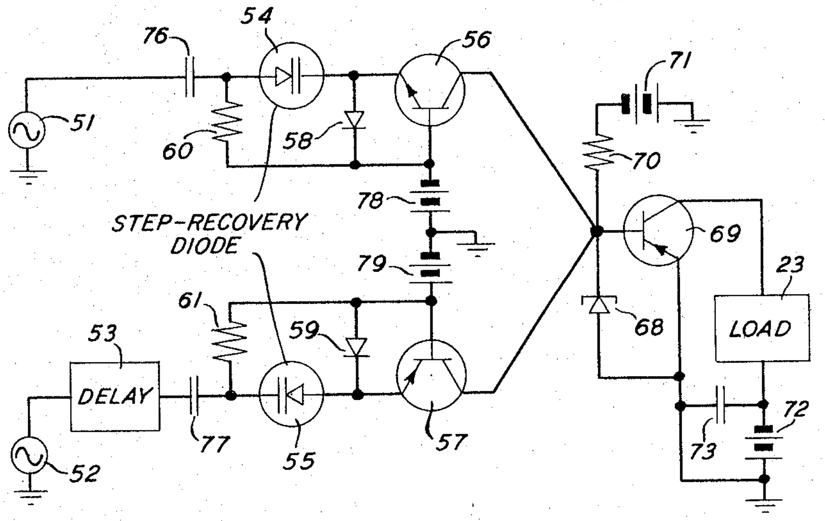

FIG. 4 illustrates an embodiment of the invention in which the transistor driven by the charge-storage step-recovery diode drives another transistor of the same conductivity type; and FIGS. 5 and 6 illustrates embodiments of the invention in which two complementary charge-storage step-recovery diode pulse generating circuits are used to drive a high-speed bistable tunnel diode output stage to provide control over output pulse length.

Figure 1:
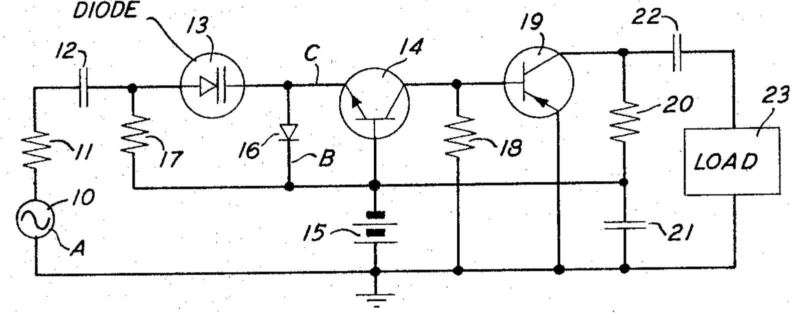
FIG. 1 illustrates an embodiment of the invention in which the transistor driven directly by the charge-storage step-recovery diode drives another transistor of the opposite conductivity type.

The embodiment of the invention illustrated in FIG. 1 may be used to generate pulses of as little as one nanosecond in duration at a repetition rate which may be of the order of hundreds of megacycles and may, with properly chosen components, even approach 1000 megacycles. The pulse repetition rate is the same as the frequency of the alternating voltage received from a control source 10 having an internal impedance 11. One side of source 10 is grounded and the other side is connected through a coupling capacitor 12 to the anode of a semiconductor charge-storage step-recovery diode 13. The alternating voltage from sourse 10 may be sinusoidal or have any other convenient waveform and may, if desired, have a D.-C. component. It may, by way of example, have a 2.5 volt peak-to-peak amplitude in order to produce 20 milliampere output pulses. Diode 13, which has a recombination time large in comparison with the period of the alternating voltage received from source 10, stores a substantial charge while it is conducting in the forward direction. When it receives a reverse voltage, it then exhibits the reverse recovery characteristics outlined above and described in detail in the cited paper by Krakauer.

The cathode of charge-storage step-recovery diode 13 in FIG. 1 is connected to the emitter electrode of a high frequency n-p-n transistor 14. The base electrode of transistor 14 is connected to the negative terminal of a D.-C. biasing source 15, the positive terminal of which is grounded. As illustrated, the polarity (i.e., the direction of forward current flow) of charge-storage step-recovery diode 13 is opposite to that of the emitter-base junction of transistor 14. A semiconductor switching diode 16, which is a high-speed diode with low capacitance and a recombination time small in comparison with that of charge-storage step-recovery diode 13, is connected across the emitter-base path of transistor 14, with the anode of diode 16 connected to the emitter electrode of transistor 14 and the cathode connected to the base. As shown, switching diode 16 is poled in the same direction as charge-storage step-recovery diode 13. A resistor 17 is connected in parallel with the series combination of diodes 13 and 16 to provide input impedance matching and to permit complete discharge of diode 13.

On the output side of transistor 14 in FIG. 1, a resistor 18 is connected from collector electrode to ground. The collector electrode of transistor 14 is also connected to the base electrode of a p-n-p transistor 19. The emitter electrode of transistor 19 is grounded and the collector is returned through the resistor 20 to the negative side of biasing source 15. A by-pass capacitor 21 is connected in parallel with biasing source 15. Finally, the collector electrode of transistor 19 is connected through a coupling capacitor 22 to one side of a suitable load 23. The other side of load 23 is grounded. If load 23 need not be grounded, it may, of course, be connected directly in place of resistor 20 and coupling capacitor 22 may be eliminated.

Figure 2:
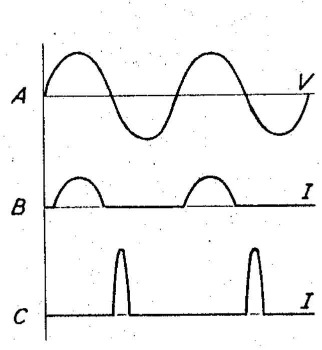
FIG. 2 shows waveforms appearing at various points in the embodiment of the invention illustrated in FIG. 1.

The operation of the embodiment of the invention shown in FIG. 1 is best explained with the aid of the waveforms illustrated in FIG. 2. The waveform of the alternating control voltage received from source 10 is, by way of example, sinusoidal, as shown in line A of FIG. 2. During each positive excursion of this control voltage, charge-storage step-recovery diode 13 begins to conduct as soon as its forward threshold is exceeded and charges through the path formed by switching diode 16, by-pass capacitor 21, A.-C. source 10, and coupling capacitor 12. The charging current waveform is shown in line B of FIG. 2. Because charge-storage step-recovery diode 13 has a recombination time which is large in comparison with the period of the alternating control voltage, it stores substantially all of the energy contained in each positive half cycle. During each negative excursion of the alternating control voltage, charge-storage step-recovery diode 13 becomes reverse biased and discharges through the path formed by the emitter-base junction of transistor 14, by-pass capacitor 21, A.-C. source 10, and coupling capacitor 12. Diode 13 retains a low impedance until its charge has been exhausted, at which time it switches abruptly to the high impedance normally associated with reverse saturation. The resulting spikes of current through the emitter-base junction of transistor 14 are illustrated in line C of FIG. 2. Each of these switches transistor 14 into its conducting state for as long as it persists, thus providing voltage amplification. Additional voltage and current amplification are provided by the common-emitter output stage formed by transistor 19 and its associated circuit elements.

Figure 3:
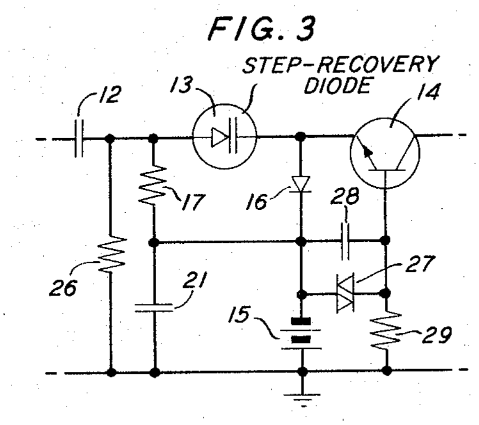
FIG. 3 shows a modification of the embodiment of the invention illustrated in FIG. 1 in which the charge-storage step-recovery and switching diodes are biased to increase the amount of energy stored during each cycle of the alternating current control wave.

An alternative arrangement to that illustrated in FIG. 1 is shown in FIG. 3, where charge-storage step-recovery diode 13 is made to conduct over a greater portion of each cycle of the received control current and where the output pulses are thereby increased still further in amplitude. In FIG. 3, a forward bias slightly less than their combined forward thresholds is provided for charge-storage step-recovery diode 13 and switching diode 16 and an additional forward bias slightly less than their combined forward thresholds is provided for switching diode 16 and the emitter-base junction of transistor 14. To furnish these biases, a resistor 26 is returned to ground from the anode of step-recovery diode 13, forming a voltage divider with resistor 17, the parallel combination of a varistor 27 and a by-pass capacitor 28 is inserted between the base electrode of transistor 14, and the cathode of switching diode 16 and a resistor 29 is returned to ground from the base electrode of transistor 14. As a result, a greater amount of energy is stored in charge-storage step-recovery diode 13 during positive excursions of source 10 because the forward threshold of diode 13 is exceeded sooner and the output pulses are increased in amplitude. The arrangement shown is, of course, one for providing the additional biases without using additional voltage sources. Individual biasing sources may be used instead whenever available.

Another alternative to the embodiment of the invention in FIG. 1 is shown in FIG. 4. This pulse generator is like the other except that it is arranged so that both transistors are of the same conductivity type. As illustrated, charge-storage step-recovery diode 13 in FIG. 1 is replaced by an oppositely poled charge-storage step-recovery diode 31 in FIG. 4, n-p-n transistor 14 is replaced by p-n-p transistor 32 in FIG. 4, and switching diode 16 is replaced by an oppositely poled switching diode 33 in FIG. 4. Transistor 19 and its associated circuit elements in the output stage remain the same.

On the output side of transistor 32 in FIG. 4, the collector is connected to the negative terminal of biasing source 15 through the primary winding of a pulse transformer 34, the secondary winding of which is connected between the base electrode of transistor 19 and ground. On the input side, both resistor 17 and switching diode 33 are grounded as illustrated. Since the collector of transistor 32 is connected to the negative terminal of biasing source 15, the base of transistor 32 is returned directly to ground. As shown, there is a net phase reversal through transformer 34.

The operation of the alternative embodiment of the invention illustrated in FIG. 4 is like that of the embodiment shown in FIG. 1 except that charge-storage step-recovery diode 31 conducts in the forward direction during negative, rather than positive, excursions of the voltage received from control source 10. The charging path includes switching diode 33, coupling capacitor 12, and control source 10. During positive excursions, charge-storage step-recovery diode 31 discharges through the emitter-base junction of transistor 32. As transistor 32 switches to its conducting state during each positive excursion, the ensuing pulses of collector current are amplified further by transistor 19. The result, as before, is a train of extremely short duration pulses occurring at a very high repetition rate.

In the embodiments of the invention illustrated in FIGS. 1, 3, and 4, transistors of opposite conductivity type from those illustrated may, of course, be used as long as the relative polarities of all biasing sources and diodes are reversed. Output pulses are then reversed in polarity from those produced by the respective circuits illustrated.

In the embodiments of the invention which have thus far been described, pulse lengths are controllable only to a limited degree at any given repetition rate. FIGS. 5 and 6 illustrate embodiments which overcome this limitation. Both employ a pair of complementary charge-storage step-recovery diode pulse generators to set and reset a high speed bistable circuit. By controlling the phase difference between the two incoming A.-C. control waves applied to the charge-storage step-recovery diodes, the length of the output pulses generated can be varied over a wide range.

In FIG. 5, a pair of oppositely phased A.-C. sources 51 and 52 are employed. These provide control waves of the same frequency and may, in fact, stem from a single common source. A delay circuit 53, which need amount to no more than an added length of coaxial cable, is connected in series with source 52 to provide the necessary phase difference between the waves from the two sources. These waves are applied through respective charge-storage step-recovery diodes 54 and 55 to the emitter electrodes of transistors 56 and 57. Transistors 56 and 57 are of opposite conductivity type, as shown, and each charge-storage step-recovery diode is poled in the opposite direction from the emitter-base junction of the associated transistor. Switching diodes 58 and 59 are connected between the emitter and base electrodes of transistors 56 and 57, respectively, and are poled in the same direction as the associated ones of charge-storage step-recovery diodes 54 and 55. Resistors 60 and 61 are connected in parallel with the series combination of charge-storage step-recovery diode 54 and switching diode 58 and the series combination of charge-storage step-recovery diode 55 and switching diode 59, respectively. The base electrodes of both transistors are grounded.

The collector electrode of transistor 56 in FIG. 5 is connected through a resistor 62 to the positive terminal of a D.-C. biasing source 63, the negative terminal of which is grounded. The collector electrode of transistor 57 is similarly connected through a resistor 64 to the negative terminal of a D.-C. biasing source 65, the positive terminal of which is grounded. The two collector electrodes are also connected through respective coupling capacitors 66 and 67 to the input terminal of a high-speed bistable circuit of known design made up principally of a tunnel diode 68 and a p-n-p transistor 69.

In the bistable output stage in FIG. 5, the input terminal is the base electrode of transistor 69. Tunnel diode 68 is connected between the base of transistor 69 and ground and is poled toward the former. The base of transistor 69 is also connected from a resistor 70 to the negative side of a D.-C. biasing source 71. The positive side of source 71 is grounded. The emitter electrode of transistor 69 is grounded and the collector electrode is connected to one side of load 23, the other side of which is connected to the negative terminal of a D.-C. biasing source 72. The other side of source 72 is grounded. Source 72 is shunted by by-pass capacitor 73.

In FIG. 5, as can readily be observed, load 23 is not grounded. If it is necessary that load 23 be grounded, this may be accomplished in the manner shown in FIGS. 1 and 4.

The two charge-storage step-recovery diode pulse generators in FIG. 5 function in much the same manner as the one illustrated in FIG. 1. Since the transistors 56 and 57 are of opposite conductivity type and diodes 54 and 58 are oppositely poled from diodes 55 and 59, the pulses applied to the bistable output stage from the two generators are of opposite polarity. The pulses received from transistor 56 are negative-going and set the bistable circuit (i.e., switch it to one state) while those received from transistor 57 are positive-going and reset it (i.e., return it to its original state). The duration of each of the resulting pulses supplied to load 23 is dependent upon the time interval by which each reset pulse lags its preceding set pulse. That lag time is, in turn, determined by the amount of phase delay imposed by delay circuit 53.

While the embodiment of the invention shown in FIG. 5 makes use of D.-C. coupling at the input and A.-C coupling to the bistable circuit, the embodiment illustrated in FIG. 6 makes use of A.-C. coupling at the input and D.-C. coupling to the bistable circuit. In FIG. 6, source 51 and delay circuit 53 are connected to charge-storage step-recovery diodes 54 and 55 through coupling capacitors 76 and 77, respectively, and the collector electrodes of transistors 56 and 57 are connected directly to the input terminal of the bistable circuit. To provide the proper operating biases, transistor 56 has its base electrode connected to the negative terminal of a D.-C. biasing source 78 and transistor 57 has its base electrode connected to the positive terminal of a D.-C. biasing source 79. The positive terminal of source 78 and the negative terminal of source 79 are grounded. Operation is substantially the same as in FIG. 5, with negative-going pulses from transistor 56 setting the bistable circuit and positive-going pulses from transistor 57 resetting it.

It is to be understood that the above-described arrangements are illustrative of the application of the principles of the invention. Numerous other embodiments may be devised by those skilled in the art without departing from the spirit and scope of the invention.

What is claimed is:

1. A high-speed pulse generator which comprises a source of alternating voltage, a semiconductor charge-storage step-recovery diode having a recombination time which is large in comparison with the period of the alternating voltage from said source, a series charging path for said charge-storage step-recovery diode operative during excursions of one polarity of the alternating voltage from said source which includes said charge storage step-recovery diode, said source, and a switching diode poled in the same direction as said charge-storage step-recovery diode, and a series discharge path for said charge-storage step-recovery diode operative during excursions of the other polarity of the alternating voltage from said source which includes said charge-storage step-recovery diode, said source, and the emitter-base junction of a transistor, said emitter-base junction being poled in the opposite direction from said charge-storage step-recovery diode.

2. A high-speed pulse generator which comprises a source of alternating voltage, a transistor having an emitter electrode, a collector electrode, and a base electrode, a semiconductor charge-storage step-recovery diode having a recombination time which is large in comparison with the period of the alternating voltage from said source, said charge-storage step-recovery diode being connected between one side of said source and the emitter electrode of said transistor and poled in the opposite direction from the emitter-base junction of said transistor and the other side of said source being connected to the base electrode of said transistor, and a switching diode connected between the emitter and base electrodes of said transistor and poled in the same direction as said charge-storage step-recovery diode, whereby said source and said switching diode form a charging path for said charge-storage step-recovery diode during excursions of one polarity of the alternating voltage from said source and said source and the emitter-base junction of said transistor form a discharge path during excursions of the other polarity.

3. A high-speed pulse generator which comprises a source of alternating voltage, a transistor having an emitter electrode, a collector electrode, and a base electrode, a semiconductor charge-storage step-recovery diode having a recombination time which is large in comparison with the period of the alternating voltage from said source, said charge-storage step-recovery diode being connected between one side of said source and the emitter electrode of said transistor and poled in the opposite direction from the emitter-base junction of said transistor and the other side of said source being connected to the base electrode of said transistor, a semiconductor switching diode connected between the emitter and base electrodes of said transistor and poled in the same direction as said charge-storage step-recovery diode, whereby said source and said switching diode form a charging path for said charge-storage step-recovery diode during excursions of one polarity of the altenrating voltage from said source and said source and the emitter-base junction of said transistor form a discharge path during excursions of the other polarity, and means to bias said charge-storage step-recovery diode and said switching diode in the forward direction by a voltage less than their combined forward threshold voltages.

4. A high-speed pulse generator which comprises a source of alternating voltage, a semiconductor charge-storage step-recovery diode having a recombination time which is large in comparison with the period of the alternating voltage from said source, a series charging path for said charge-storage step-recovery diode operative during excursions of one polarity of the alternating voltage from said source which includes said charge-storage step-recovery diode, said source, and a semiconductor switching diode poled in the same direction as said charge-storage step-recovery diode, a series discharge path for said charge-storage step-recovery diode operative during excursions of the other polarity of the alternating voltage from said source which includes said charge-storage step-recovery diode, said source, and the emitter-base junction of a transistor, said emitter-base junction being poled in the opposite direction from said charge-storage step-recovery diode, and means to bias said charge-storage step-recovery diode and said switching diode in the forward direction by a voltage less than their combined forward threshold voltages.

5. A high-speed pulse generator which comprises a pair of sources alternating voltage of respectively different phases, a pair of semiconductor charge-storage step-recovery diodes each having a recombination time large in comparison with the period of the alternating voltage from said sources, a separate series charging path for each of said charge-storage step-recovery diodes operative during excursions of one polarity of the alternating voltage from a respective one of said sources which includes a respective one of said charge-storage step-recovery diodes, said respective source, and a switching diode poled in the same direction as said respective charge-storage step-recovery diode, a separate series discharge path for each of said charge-storage step-recovery diodes operative during excursions of the other polarity of the alternating voltage from said respective source which includes a respective one of said charge-storage step-recovery diodes, a respective one of said sources, and the emitter-base junction of a transistor, the transistors in said discharge paths being of respectively opposite conductivity types and the emitter-base junction of each of said transistors being poled in the opposite direction from said respective charge-storage step-recovery diode, and a common bistable circuit connected to be switched to one state by one of said transistors and to the other side by the other of said transistors.

References Cited by the Examiner

UNITED STATES PATENTS

| | | | |
|---|---|---|---|
| 2,866,178 | 12/1958 | Lo et al. | 307—88.5 |
| 3,038,084 | 6/1962 | De Miranda | 307—88.5 |
| 3,221,185 | 11/1965 | Cubert et al. | 307—88.5 |

References Cited by the Applicant

UNITED STATES PATENTS

| | | |
|---|---|---|
| 3,076,902 | 2/1963 | V. E. Van Duzer et al. |
| 3,089,967 | 5/1963 | G. Strull. |

ARTHUR GAUSS, *Primary Examiner.*

J. HEYMAN, *Assistant Examiner.*